Nov. 3, 1964   J. M. HUNT   3,155,461

FRAME MEMBERS

Filed June 19, 1961

3,155,461
FRAME MEMBERS
Joseph M. Hunt, Natrona Heights, Pa., assignor to Allegheny Ludlum Steel Corporation, Brackenridge, Pa., a corporation of Pennsylvania
Filed June 19, 1961, Ser. No. 117,887
2 Claims. (Cl. 29—191)

Heretofore extruded frame members of aluminum have been used and produced extensively in the production of storm doors, windows and the like. Such articles have also been fabricated from stainless steel, but the resulting articles are more expensive than those extruded from aluminum. Because of the appearance and physical properties of stainless steel, there has been a commercial demand for such stainless steel articles at a cost approximating that of the articles formed of extruded aluminum. Heretofore, however, this has been impossible to satisfy because of the inherent differences in price and the differences in cost of fabrication of the two different metals. To overcome this commercial dissatisfaction with respect to producing such articles from stainless steel, attempts have been made to combine stainless steel and aluminum into suitable frame members, but these attempts have not been successful heretofore.

An object of this invention is to provide a composite frame member of aluminum and stainless steel strip for use in the production of doors, windows, architectural members, building components and the like.

Another object of this invention is to provide an extruded aluminum frame member having stainless steel strip facing thereon, the facing being maintained in assembled relation on the aluminum frame member by a frictional engagement between the frame member and the stainless steel strip.

A further object of this invention is to provide a composite frame member of aluminum and a strip of stainless steel, the aluminum being in the form of an extrusion having a predetermined cross section configuration and having opposed inwardly turned flange members adjacent the outer edges of a face thereon to form opposed grooves thereon, the strip of stainless steel being seated in such grooves, and the flange members being deformed to seat against the strip to frictionally hold the stainless steel strip in assembled relation to provide a stainless steel face on the aluminum extrusion.

Other objects of this invention will become apparent when taken in conjunction with the accompanying drawing in which.

Figure 1:
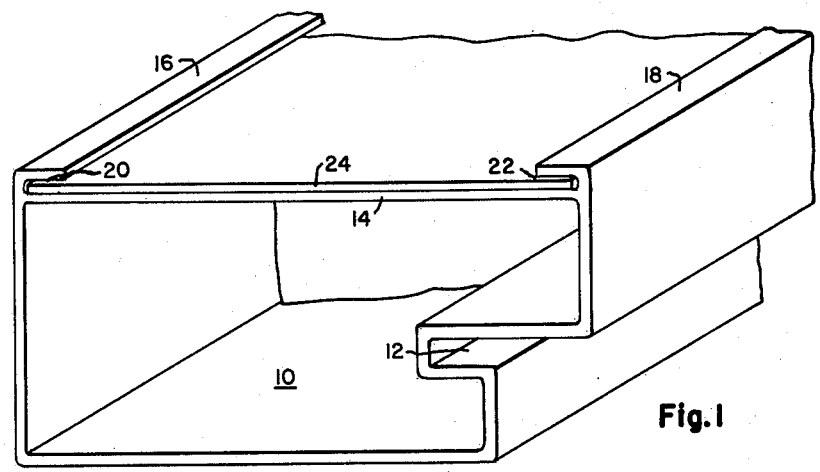
FIG. 1 is a view in prespective of an extruded aluminum frame member having a strip of stainless steel assembled therewith.

In practicing this invention, aluminum is extruded into a longitudinally extending frame member 10 (see FIG. 1) having a predetermined cross section configuration suitable for making the article desired. The frame member 10 illustrated is one suitable for making a door, and as extruded is provided with a groove 12 for receiving glass or screening as desired. Normally the side 14 of the extrusion forms an exposed flat front face of the aluminum frame member 10, but in accordance with this invention, the frame member 10, when extruded, is provided with two integrally formed, inwardly extending flange members 16 and 18 at the outer edges of the side 14. The flange members 16 and 18 are formed substantially parallel with the side 14 and extend longitudinally of the extrusion for the length of the extrusion and cooperate with the side 14 to form opposed grooves 20 and 22, respectively, having a predetermined width, as will be explained more fully hereinafter.

In acordance with this invention, stainless steel is formed into flat rolled strip 24 having a predetermined gauge or thickness and a width that is substantially equal to that of the side 14, although slightly less, so that the strip 24 can be fitted into the grooves 20 and 22 as by sliding the strip therein.

The term stainless steel, as applied in the present specification, is intended to include all the steels classified by the American Iron and Steel Institute as being standard grades of stainless steel. These include the Type 400 series stainless steel that contain chromium in amounts of from about 10%, by weight, to about 30%, by weight, and generally less than 1% carbon, such as AISI Types 410 and 430 and additionally the AISI Type 300 series which contain, in addition to Cr and C, a nickel content of from 6 to 30% which renders the steel structure "austenitic," such as AISI Type 301, 302 and 304, and the 200 series steels which contain not only nickel in amounts of 1 to 10%, but also up to about 30% Mn and .60% $N_2$ as additional austenitizers. Such various stainless steel analyses may contain additionally, as impurities or alloying ingredients, small amounts of P, S, Cu, Mo, Se, B, Be, Co, W, Ti, Cb, Ta, V, Zn, Al, Si, rare earths, etc. All stainless steels, however contain chromium within the range of from about 10% to 30% and carbon up to about 1%. The Cr content in every instance is the element that primarily effects the essential property of oxidation and corrosion resistance and consequently the article of the present invention may be broadly said to be composed partly of a steel that consists essentially of carbon in an amount up to about 1%, chromium from 10 to 30%, and the balance iron.

In practice, the grooves 20 and 22 are formed to have a width of about 10% to about 50% greater than the predetermined thickness of the strip 24 of stainless steel so that the strip 24 can be readily inserted in the assembled relation in the opposed grooves 20 and 22 without binding. It is desired that the width of the grooves 20 and 22 be not more than 50% in excess of thickness of the strip 24 so that flow of the metal of the flanges 16 and 18 will not be encountered when they are deformed, as will be described hereinafter. In practice, it has been found to be satisfactory for the grooves 20 and 22 to have a width of .030" where the strip 24 is formed of a .020" Type 430 stainless, and a width of .035" where the strip 24 is formed of a .025" Type 430 stainless. Preferably, the flanges 16 and 18 are about .035" thick and extend inwardly only about .130" from the outer side surface of the extruded frame member 10.

Figure 3:
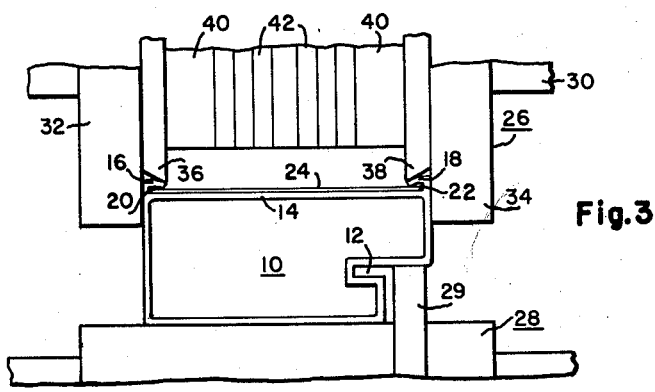
FIG. 3 is a fragmentary elevation view illustrating a preferred mode of securing the strip of stainless steel in assembled relation to provide an exposed face of stainless steel on the aluminum extrusion.

In order to secure the strip 24 in assembled relation with respect to the frame member 10, flange members 16 and 18 are physically deformed towards the side 14 to force the free edges of the flange members 16 and 18 into seating engagement throughout their lengths with the exposed surface of the stainless steel strip 24 to frictionally hold the strip 24 in position in the opposed grooves against the outer face of said side 14. Referring to FIG. 3, a preferred mode for effecting the described deformation of the flange members 16 and 18 is illustrated.

In the embodiment of FIG. 3, the frame member 10, having the strip 24 in assembled position in the opposed grooves 20 and 22, is fitted between spaced rolls 26 and 28, the lower roll 28 being a cylindrical roll, preferably of hard rubber or the like, and in this instance having an enlarged section 29 for supporting a portion of the frame member as it is fed between the rolls. The upper roll 26 is of the type known as a crimping roll having a shaft 30, two spaced side guide plates 32 and 34 spaced so as to receive the frame member 10 therebetween, and a pair of spaced crimping discs 36 and 38 disposed adjacent the side plates 32 and 34, respectively. A plurality of filler discs 40 and 42, having a smaller diameter than that of the crimping discs 36 and 38, are positioned on the shaft 30 to space the crimping discs 36 and 38 so that the edges of such discs will bear against the flange members 16 and 18 as the frame member 10 is fed through the spaced rolls 26 and 28. As illustrated, the crimping discs 36 and 38 have their outer edges beveled in an opposed manner so that the edges of the crimping discs 36 and 38 spaced from the side plates 32 and 34, respectively, are of greater diameter than the edge of such crimping disc that is seated against the side plates 32 and 34. Preferably, the edges of the crimping discs 36 and 38 are beveled at an angle of 60 to 65° from the side plates 32 and 34, respectively, with the crimping discs 36 and 38 having a thickness of about .123" where the flange members 16 and 18 extend inwardly about .130". The contact of the crimping discs 36 and 38 with the flange members 16 and 18, respectively, is thus adacent the outer free edges of such flanges to force such free edges into tight engagement with the strip 24 and hold the strip against the face of the flat side 14 as clearly shown in FIG. 3.

Figure 2:
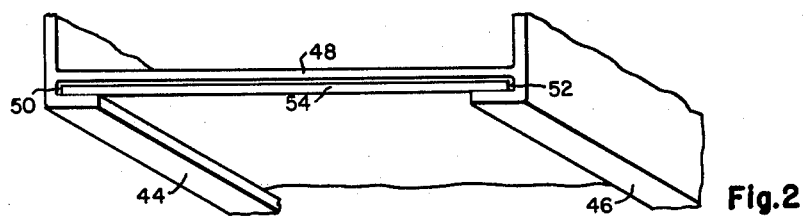
FIG. 2 is a fragmentary perspective view of the lower portion of an aluminum extrusion similar to that of FIG. 1 but modified to receive a strip of stainless steel on such lower face.

As the frame member 10 passes between the rolls 26 and 28, it is thus seen that the opposed flange members 16 and 18 are simultaneously deformed into a frictional engagement with the strip 24 simply by bending the flange members without affecting the flow of the metal thereof to any measurable degree, with the result that the edges of the flanges 16 and 18, after having been so forced into frictional engagement with the strip 24, give the appearance of a perfectly straight line so that such deformation will not detract from the appearance of the resulting face on the frame member 10. Spacing between the flange members 16 and 18 and the strip 24 is such where the grooves are formed having a width of 10 to 50% in excess of thickness of the strip 24 that deformation of the flange members 16 and 18 is readily accomplished without effecting a detrimental flow of the metal and without any spring-back of the flange members once they have been so deformed. When thus assembled, the strip 24 of stainless steel is so tightly held in an assembled position against the face of the side 14 as to give the appearance of being integrally formed with the extruded member.

Where it is desired to cover the opposed faces of the extruded frame member 10 with a strip of stainless steel, the lower face or side of the extruded frame member 10 may be formed to have inwardly turned flange members 44 and 46 as illustrated in FIG. 2 at the opposite edges of the lower side 48 in a manner similar to the formation of the flanges 16 and 18 at the upper side 14 of the extruded member. Thus flange members 44 and 46 may be provided so as to form opposed grooves 50 and 52 for receiving a bottom strip 54 of stainless steel in the same manner that the upper strip 24 of stainless steel is received to cover the upper face of the extruded frame member 10. The clearances of the strip 54 in the opposed grooves 50 and 52 should be equivalent to those specified hereinbefore with respect to the grooves 20 and 22 and the strip 24. Where the seated frame member 10 is formed with the lower flange members 44 and 46, as well as the upper flange members 16 and 18, all of the flange members may be readily and simultaneously deformed into seating engagement with the stainless steel strip members held therein by passing the assembly through a pair of the crimping rolls 26 so that the lower crimping roll (not shown) will function in the same manner as that described with respect to the assembly of FIG. 3 herein. The crimping discs of such lower crimping roll will be spaced thereon as to seat against the flange members 44 and 46 as the crimping discs 36 and 38 of the upper crimping roll 26 seat against the flange members 16 and 18, respectively, whereby all four of the flange members 16–18 and 44–46 will be simultaneously deformed into physical engagement with the upper and lower strips 24 and 54, respectively, of stainless steel to thereby hold such strips in relation with the extruded frame member.

This invention makes it possible to economically produce composite frame members suitable for use in doors, windows and the like, such frame members being formed of composites of aluminum and stainless steel so that the advantage of both may be utilized in making such articles. The composite so formed is a rigid type construction, and when utilized in making such articles as doors and frames gives the appearance of a solid stainless steel article. The beauty and utility of such article, when taken in conjunction with the economies effected, make it possible to produce articles having commercial acceptance which has heretofore not been possible.

I claim:

1. A composite frame member of aluminum and stainless steel for doors, windows, architectural members, and building components comprising, in combination, a longitudinally extending extrusion of aluminum having a predetermined cross section configuration with a flat face thereon of pedetermined width and having opposed longitudinally extending, inwardly turned flange members disposed adjacent the outer longitudinally extending edges of and substantially parallel to said face to form opposed grooves thereon, a longitudinally extending flat strip of stainless steel having a predetermined thickness and being of a width substantially equal to the width of said face, said flat strip being disposed in seated relation in said opposed grooves, said flange members being initially disposed substantially parallel to said flat face but spaced therefrom to provide said grooves with a width of from about 10% to about 50% in excess of said predetermined thickness of said flat strip to provide clearance to receive said strip in said seated relation therewith, said flange members being deformed when said flat strip is seated in said opposed grooves to seat the outer edges of said flange members into frictional engagement with said flat strip to maintain said strip seated in said grooves against said face to thereby provide a flat facing of stainless steel over said face of the aluminum extrusion, said deformed outer edges of said flange members being in substantially straight lines.

2. A composite frame member of aluminum and stainless steel for doors, windows, architectural members, and building components comprising, in combination, a longitudinally extending extrusion of aluminum having a predetermined cross section configuration with flat face means thereon of predetermined width and having opposed longitudinally extending, inwardly turned flange members disposed adjacent the outer longitudinally extending edges of and substantially parallel to said face means to form opposed grooves thereon, a longitudinally extending flat strip of stainless steel having a predetermined thickness and being of a width substantially equal to the width of said face means, said flat strip being disposed in seated relation in said opposed grooves, said flange members being initially disposed substantially parallel to said flat face means but spaced therefrom to provide said grooves with a width greater than 10% in excess of said predetermined thickness of said flat strip to provide clearance to receive said strip in said seated relation therewith, said flange members being deformed when said flat strip is seated in said opposed grooves to seat the outer edges of said flange members into frictional engagement with said flat strip to maintain said flat strip seated in said grooves against said face means to thereby provide a flat facing of stainless steel over said face means of the aluminum extrusion, said deformed outer edges of said flange members being in substantially straight lines.

References Cited in the file of this patent

UNITED STATES PATENTS

| | | |
|---|---|---|
| 1,730,034 | Faulk | Oct. 1, 1929 |
| 2,270,278 | Dunn | Jan. 20, 1942 |

FOREIGN PATENTS

| | | |
|---|---|---|
| 143,450 | Australia | Sept. 17, 1951 |

OTHER REFERENCES

Modern Metals, vol. 5, Issue 12, page 17, pub. date January 1950.